Patented Sept. 15, 1925.

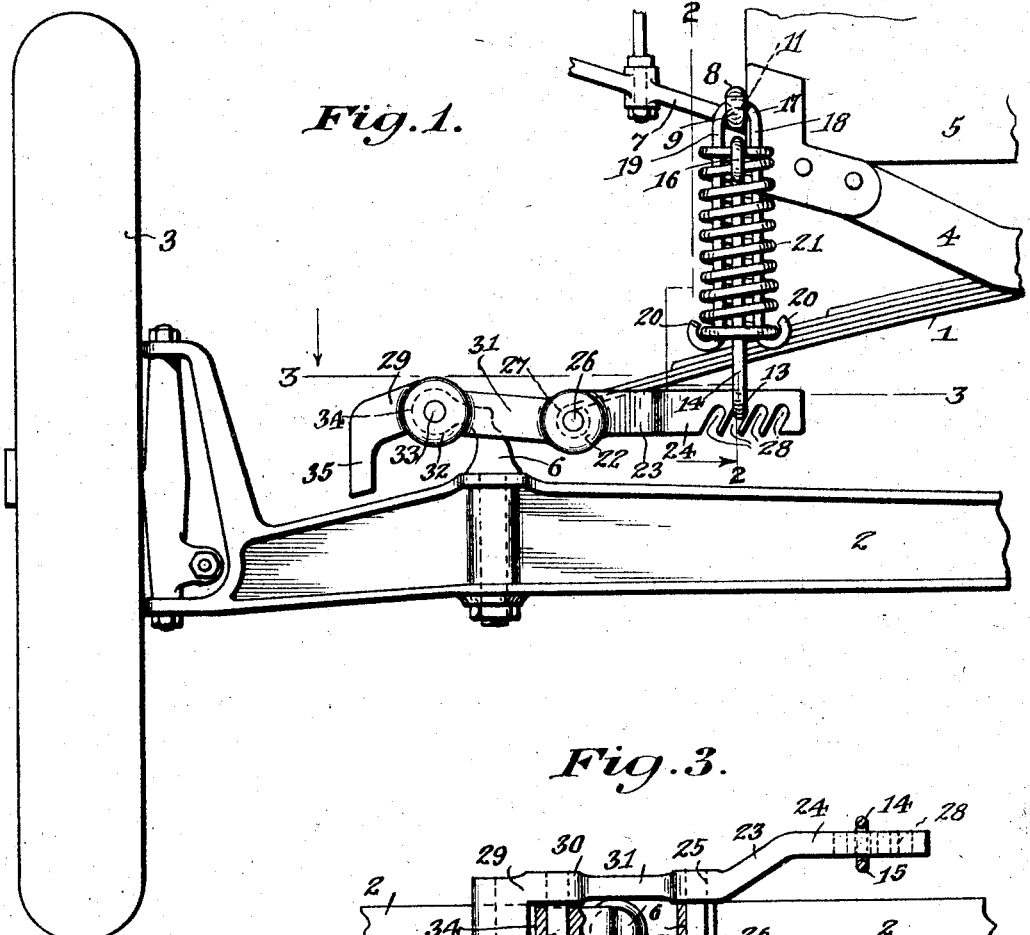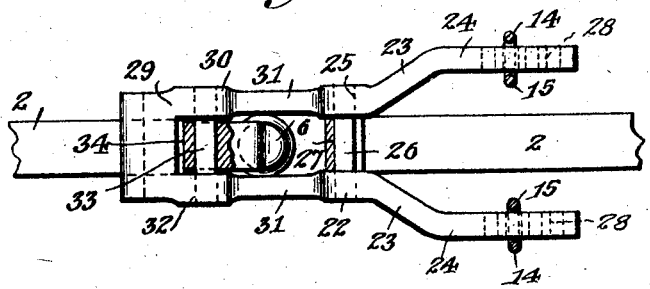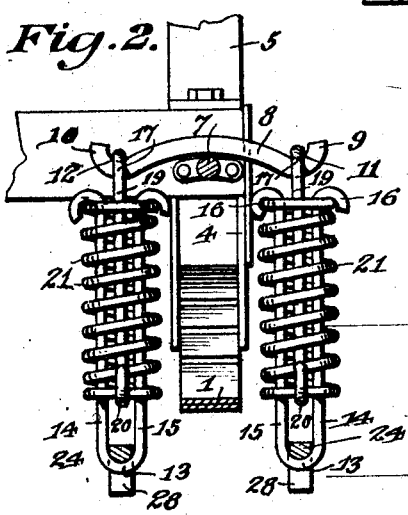

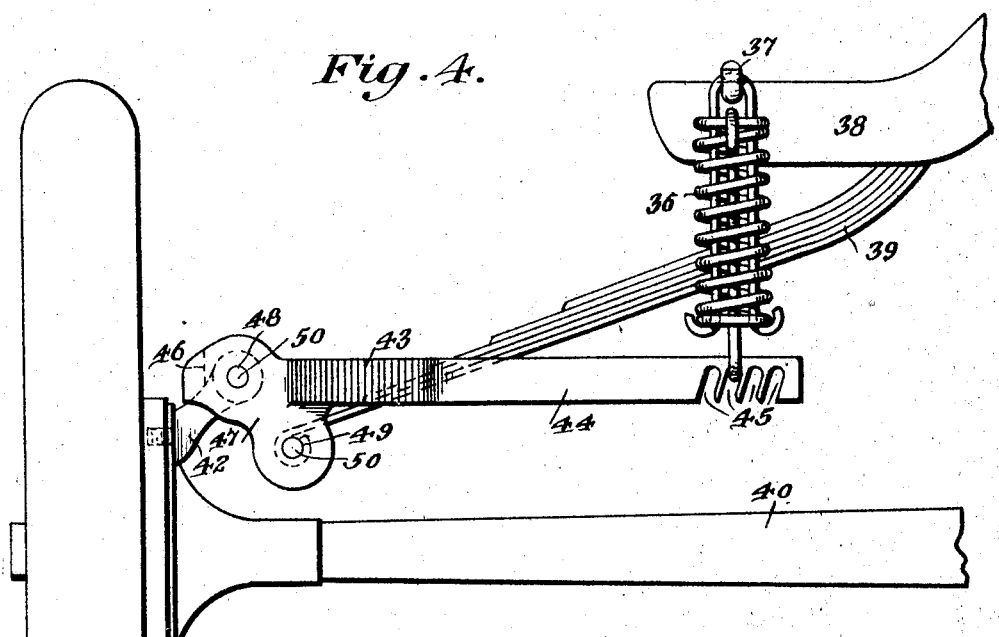
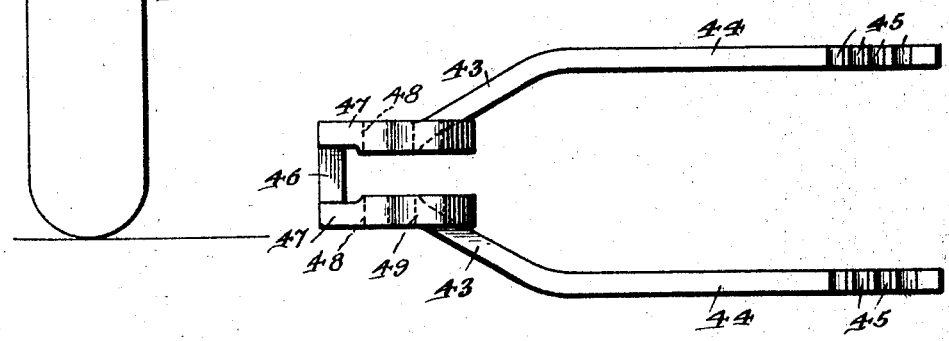

1,553,343

UNITED STATES PATENT OFFICE.

HARRY AGUSTUS WALSH, OF BURLINGTON, IOWA.

COMBINED SHOCK-ABSORBING AND SNUBBING DEVICE.

Application filed May 25, 1923. Serial No. 641,406.

*To all whom it may concern:*

Be it known that I, HARRY AGUSTUS WALSH, a citizen of the United States, residing at Burlington, in the county of Des Moines and State of Iowa, have invented certain new and useful Improvements in Combined Shock-Absorbing and Snubbing Devices, of which the following is a specification.

This invention relates to a combined shock absorbing and snubbing device designed primarily for use in connection with motor vehicles of the "Ford" type, but it is to be understood that a device in accordance with this invention can be employed in connection with any construction of vehicle for which it is found applicable, and the invention has for its object to provide a device of such class, in a manner as hereinafter set forth, including means which when set up in operative relation with respect to a vehicle spring will provide for the breaking and absorbing of excessive shocks and jars, thereby enabling the vehicle to ride much easier than otherwise would be possible.

Further objects of the invention are to provide a combined shock absorbing and snubbing device, which is comparatively simple and inexpensive in its construction, strong, durable, thoroughly efficient and convenient in its use, which can be readily applied to conventional types of vehicles without any material changes in the construction thereof, which is not liable to become clogged with accumulation of mud and dirt, and which will operate in a thoroughly effective manner to absorb shocks and jars and prevent excessive rebound.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation, broken away, showing the adaptation of a combined shock absorbing and snubbing device in accordance with this invention, in connection with the front spring of a vehicle.

Figure 2 is a section on line 2—2, Figure 1.

Figure 3 is a section on line 3—3, Figure 1.

Figure 4 is a front elevation, broken away, showing the adaptation of a combined shock absorbing and snubbing device, in accordance with this invention, of a form for use in connection with the rear spring of a vehicle.

Figure 5 is a bottom plan view of the lever element used in connection with the form shown in Figure 4.

Referring to Figures 1, 2 and 3 of the drawings, a combined shock absorbing and snubbing device in accordance with this invention, is illustrated by way of example in connection with a motor vehicle of the "Ford" type, and 1 denotes the front spring of the vehicle, 2 the front axle, 3 one of the front wheels, 4 the front cross member or brace and 5 the radiator of the vehicle. The axle 2 is provided with the front spring perch 6. The reference character 7 denotes a fender brace from which the cushioning elements of the device are suspended.

The vehicle spring 1, is adapted to have each of its ends connected with a combined shock absorbing and snubbing device in accordance with this invention, and each device is also connected or suspended from a fender brace 7 and the description of the device at one end of the spring 1, is to be understood as setting forth the construction of the device which is applied to the other end of spring 1.

The combined shock absorbing and snubbing device, in accordance with this invention, employed in connection with the front spring 1 of the vehicle, comprises a suspension element, a pair of cushioning elements, and a lever element provided with an extension to constitute a snubber, and said suspension element consists of a bar formed of a segment-shaped intermediate portion 8 and a pair of up-turned outer portions 9 and 10 providing seats 11 and 12 respectively, and said up-turned portions 9 and 10 constitute means for retaining the cushioning elements on the seats 11 and 12 of the suspension element.

Each of the cushioning elements consists of a vertically disposed narrow substantially elongated yoke-shaped member formed of a curved base 13, a pair of vertically disposed parallel arms 14, 15, and with the free end of each of said arms provided with a laterally disposed hook-shaped terminal 16. The terminals 16 are oppositely disposed with respect to each other. The said cushioning element further includes an inverted yoke-shaped member comprising a head 17, a pair of depending parallel arms 18, 19, and each of said arms has a laterally disposed hook-shaped lower terminal 20. The terminals 20 are oppositely disposed with respect to each other and are also positioned to extend at right angles with respect to the terminals 16. The inverted yoke-shaped member extends within the other member of the cushioning element and is disposed at right angles with respect thereto, and the head 17 of the inverted yoke-shaped member is mounted in the seat 11 or 12. The members of the cushioning element are surrounded by an expansible and contractile coiled spring 21 which has one end overlapped by the hook-shaped terminals 16, and its other end overlapped by the hook-shaped terminals 20, and by this arrangement the members of the cushioning element are resiliently connected together.

The lever element is in the form of a fork or yoke and includes a pair of opposed arms or tines and each includes an outer terminal portion 22, an intermediate inclined portion 23 and an inner terminal portion 24. The portion 23 extends at an outward inclination whereby the portion 24 of the arm will be offset with respect to the portion 22, but will be positioned in a plane parallel to the plane of the portion 22. The inclined portion 23 of one of the arms is oppositely disposed with respect to the inclined portion 23 of the other of the arms and the outer terminal portion 22 of each of the arms is provided with an opening 25 for the reception of a pin 26, for the purpose of connecting the end 27 of the spring 1 therewith. The inner terminal portion 24 of each of the arms is formed with a series of inclined slots 28 and with the inclination of said slots rearwardly. The slots 28 open at the bottom edge of the inner terminal portion 24 and selectively receive the base 13 of a yoke-shaped member whereby in connection with the seat 11, a cushioning element is connected to the suspension and lever elements and further interposed between said elements, as well as held in a vertical position.

Each of the lever elements further includes a yoke-shaped head 29, having each of its arms 30 formed with an integral extension 31, which extends to and is formed integral with the outer terminal portion 22 of an arm, and said extension 31 provides what may be termed a coupling means between the head 29 and a lever arm. Each of the arms 30 of the head 29 is provided with an opening 32 for the reception of a pivot pin 33, which extends through the angularly disposed upper terminal portion 34 of the perch 6. The angularly disposed portion 34 of the perch 6 extends outwardly or rather in a direction away from the pin 26.

The head 29, of the lever element, is formed with a depending L-shaped extension 35 which constitutes a snubber and is arranged over the axle 2 and is capable of contacting therewith.

In setting up the device in the manner as stated, it will be seen that it shares with the car spring in carrying the load of the car upon the frame instead of the weight upon the frame direct through the perch, and thus it will be seen that a constant pull of the inverted yoke-shaped member upon the spring 21 will place the latter under a constant equal tension when the car is at rest.

When the car is in motion and strikes an irregularity in the road, the body tends to abruptly extend towards the frame and it will be seen that when the device is set up, that the lever action will not only relieve the strain on the car spring, but also the car spring descending at pin 26 will descend a shorter distance than the device, being nearer the fulcrum or pin 33. Thus the device which is already under compression must undergo further compression and thus resist downward motion of the car itself. The second cycle in the action of the device is to return it to its normal position, and the third is to counteract the rebound. This is more readily accomplished in as much as the ascent of the car from its descended position tends to pull up on the lever element at the pin 26 and at the point of connection of the bases 13 with the lever arms, but more especially at the points of connection of the bases 13 with the lever arms. Thus when the terminal portions 24 of the lever arms reach a certain height, the snubber 35 engaging with the axle 2, arrests further upward movement of the terminal portions 24 of the lever arms. The car proper, however, still has an upward momentum, but its upward motion is changed by the device in a similar manner as the downward motion of the car proper is changed, i. e., the device being under constant compression retards further upward motion of the car.

Referring to Figures 4 and 5 of the drawings, cushioning element which is indicated generally by the reference character 36 is of the same construction as referred to in connection with Figures 1, 2 and 3. The suspension element employed in the construction shown in Figures 4 and 5, is indicated generally by the reference character 37, and is of the same construction as that shown in Figures 1 to 3.

Referring to Figures 4 and 5, 38 denotes the rear cross or brace member upon which is mounted the suspension element 37 of the vehicle, 39 the rear spring, 40 the rear axle, 41 a rear wheel, and 42 the rear spring perch.

In the form shown in Figures 4 and 5, the differences reside solely in the manner of setting up the lever element, more particularly to the arms and head of said lever element, and the latter includes a pair of arms comprising an outer portion 43 and an inner portion 44, the latter being of greater length than the former. The portion 43 is outwardly inclined and rearwardly extended with respect to the head of the lever element. The portion 43 of one arm extends in an opposite direction with respect to the portion 43 of the other arm, and the portion 44 of each of the arms is provided with a series of inclined slots 45. The inclination of the slots 45 is rearwardly and said slots 45 open at the bottom edge of the portion 44 and are provided for selectively receiving a base 13 of a yoke member. The head of the lever element consists of a cross piece 46, which constitutes a snubber and is adapted to engage the perch 42. The head of the lever element further includes a pair of inwardly extending and downwardly inclined arms 47 and each of which, intermediate its ends, at the rear thereof, has a portion 43 of a lever arm formed integral therewith. The arms 47 depend below the portions 43 of the lever arms and each of the arms 47, at its upper end is provided with an opening 48, and at its lower end with an opening 49. The openings of the arms 47 align and extending through the aligning openings 48 is a pivot 50 for connecting the lever element to the perch 42, and extending through the aligning openings 49 is a pivot 50 for connecting one end of the pivot spring 39 to the pivot element.

The form shown in Figure 4 operates in the same manner as that shown in Figures 1, 2 and 3, with this exception that the snubber contacts with the perch 42 in lieu of contacting with the axle.

The slots 28 or 45, are provided as to give a greater or less lever effect to compensate for its use, and this is accomplished by connecting the cushioning element in that slot required for proper operation.

In each form of the device shown, the lever element is of a length to extend inwardly with respect to the suspension element 8 or 37. The series of inclined slots 28 or 45 extends inwardly with respect to the suspension element 8 or 37. By so arranging the lever element, the cushioning elements can be positioned perpendicular.

The cushioning elements are so set up that the springs 21 thereof are not directly connected to the suspension element or to the lever element, but they are indirectly connected therewith through the medium of the oppositely extending yoke-shaped members of each cushioning element, and said members slidably connect their controlling spring therewith. The oppositely extending yoke-shaped members of each cushioning element perform two functions, one of which is a coupling function and the other a combined retaining and connecting function. The pair of yoke-shaped members couple the suspension element with a time of the lever element and furthermore the pair of yoke-shaped members slidably connects their controlling spring thereon and further connects their controlling spring therewith.

Although the preferred embodiment of the invention is as illustrated and described, yet it is to be understood that changes in the details of construction can be had which will fall within the light of the invention as claimed.

What I claim is:—

1. A combined shock absorbing and snubbing device for vehicles comprising a longitudinally disposed suspension element adapted to be supported from one side of the vehicle, a pair of vertically disposed cushioning elements each formed of a pair of sections resiliently connected together and each having one section thereof suspended at its upper end from one end of the suspension element, a horizontally disposed yoke-shaped head having each of its arms extending towards the vehicle body and provided with an extension projecting beyond the lower end of a cushioning element, each of said extensions having its inner portion offset to extend in a plane parallel to the plane of one of said arms, means for pivotally connecting the outer end of the vehicle spring between the inner ends of said arms, means for pivotally connecting the upper end of an outwardly directed vehicle spring perch between the outer ends of said arms, and each of said extensions having its offset portion provided with means for adjustably connecting the other section of a cushioning element thereto.

2. A combined shock absorbing and snubbing device for vehicles comprising a longitudinally disposed suspension element adapted to be supported from one side of the vehicle, a pair of vertically disposed cushioning elements each formed of a pair of sections resiliently connected together and each having one section thereof suspended at its upper end from one end of the suspension element, a horizontally disposed yoke-shaped head having each of its arms extending towards the vehicle body and provided with an extension projecting beyond the lower end of a cushioning element, each of said extensions having its inner portion offset to extend in a plane parallel to the plane of one of said arms, means for pivotally connecting the outer end of the vehicle spring between the inner ends of said arms, means for pivotally connecting the upper end of an outwardly directed vehicle spring perch between the outer ends of said arms, and each of said extensions provided with upstanding rearwardly inclined spaced slots opening at the lower edge thereof for adjustably connecting the other section of a cushioning element therewith.

3. A combined shock absorbing and snubbing device for vehicles comprising a longitudinally disposed suspension element adapted to be supported from one side of the vehicle, a pair of vertically disposed cushioning elements each formed of a pair of sections resiliently connected together and each having one section thereof suspended at its upper end from one end of the suspension element, a horizontally disposed yoke-shaped head having each of its arms extending towards the vehicle body and provided with an extension projecting beyond the lower end of a cushioning element, each of said extensions having its inner portion offset to extend in a plane parallel to the plane of one of said arms, means for pivotally connecting the outer end of the vehicle spring between the inner ends of said arms, means for pivotally connecting the upper end of an outwardly directed vehicle spring perch between the outer ends of said arms, each of said extensions having its offset portion provided with means for adjustably connecting the other section of a cushioning element thereto, and an inverted L-shaped extension projecting outwardly from said head and providing a snubber.

In testimony whereof, I affix my signature hereto.

HARRY AGUSTUS WALSH.